(12) United States Patent
Hyatt

(10) Patent No.: US 11,766,914 B2
(45) Date of Patent: Sep. 26, 2023

(54) TEMPERATURE REGULATION OF AUTOMATED DRIVING SYSTEM COMPUTER USING VEHICLE AIR CONDITIONING SYSTEM

(71) Applicant: GM Cruise Holdings LLC, San Francisco, CA (US)

(72) Inventor: David Lee Hyatt, Pacifica, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 828 days.

(21) Appl. No.: 16/702,163

(22) Filed: Dec. 3, 2019

(65) Prior Publication Data

US 2021/0162835 A1   Jun. 3, 2021

(51) Int. Cl.
*B60H 1/00* (2006.01)
*B60H 1/24* (2006.01)

(52) U.S. Cl.
CPC ..... *B60H 1/00271* (2013.01); *B60H 1/00564* (2013.01); *B60H 1/00792* (2013.01); *B60H 1/244* (2013.01); *B60H 2001/003* (2013.01)

(58) Field of Classification Search
CPC ............ B60H 1/00271; B60H 1/00207; B60H 1/00485; B60H 1/00564; B60H 1/00807; B60H 2001/00242; B60H 2001/003; B60H 1/00735; B60H 1/0073; B60H 1/00642; B60H 1/3205; B60H 2001/224; B60H 1/00792; B60H 1/244

USPC .............................................. 701/36; 454/75
See application file for complete search history.

(56) References Cited

U.S. PATENT DOCUMENTS

| 4,379,520 A * | 4/1983 | Tomsu | G05D 23/1917 236/94 |
|---|---|---|---|
| 2007/0125107 A1* | 6/2007 | Beam | F24F 11/0012 62/186 |
| 2009/0078400 A1* | 3/2009 | Tamura | H01M 10/6566 165/287 |
| 2019/0351732 A1* | 11/2019 | Rajaie | B60H 1/3227 |
| 2020/0262270 A1* | 8/2020 | Williams | B60H 1/248 |

* cited by examiner

*Primary Examiner* — Avinash A Savani
*Assistant Examiner* — Ryan L Faulkner
(74) *Attorney, Agent, or Firm* — Akona IP

(57) ABSTRACT

The present disclosure provides a system for controlling a temperature of a computer disposed in an enclosed compartment of a vehicle. The system includes at least one temperature sensor associated with the computer, the at least one temperature sensor for providing temperature data in connection with the computer to a control module; at least one air vent provided in a surface of the enclosed compartment, wherein the at least one air vent is positioned to direct air flow to a designated area of the computer; an air conditioning system for generating air at an air temperature specified by the control module based at least in part on the temperature data provided by the at least one temperature sensor; and at least one duct for conducting the air generated by the air conditioning system into the enclosed compartment via the at least one vent.

15 Claims, 5 Drawing Sheets

TEMPERATURE REGULATION OF AUTOMATED DRIVING SYSTEM COMPUTER USING VEHICLE AIR CONDITIONING SYSTEM

TECHNICAL FIELD OF THE DISCLOSURE

The present disclosure relates generally to autonomous vehicles (AVs) and, more specifically, to temperature regulation of an Automated Driving System Computer (ADSC) of an AV using the AV's air conditioning system.

BACKGROUND

Vehicle automation has been suggested as a means to increase vehicle safety almost as long as cars have been in existence. Experiments on autonomy in cars have been conducted since at least the 1920s. Only recently, though, has computer technology advanced enough to make true vehicle automation possible. Current automated driving systems are designed to enable safe and efficient autonomous and/or semi-autonomous operation of a vehicle in a variety of driving situations and environments.

Automated driving systems include at least a variety of sensing and imaging devices (e.g., a sensor suite) mounted to the vehicle in various locations and an automated driving system computer ("ADSC") for processing data from the sensing and imaging devices and controlling operation of the vehicle. Given its size, the ADSC may be installed in a trunk of the vehicle, where it is susceptible to overheating. Allowing the ADSC to overheat may cause temperature faults and safe stops, ultimately resulting in mission failure.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
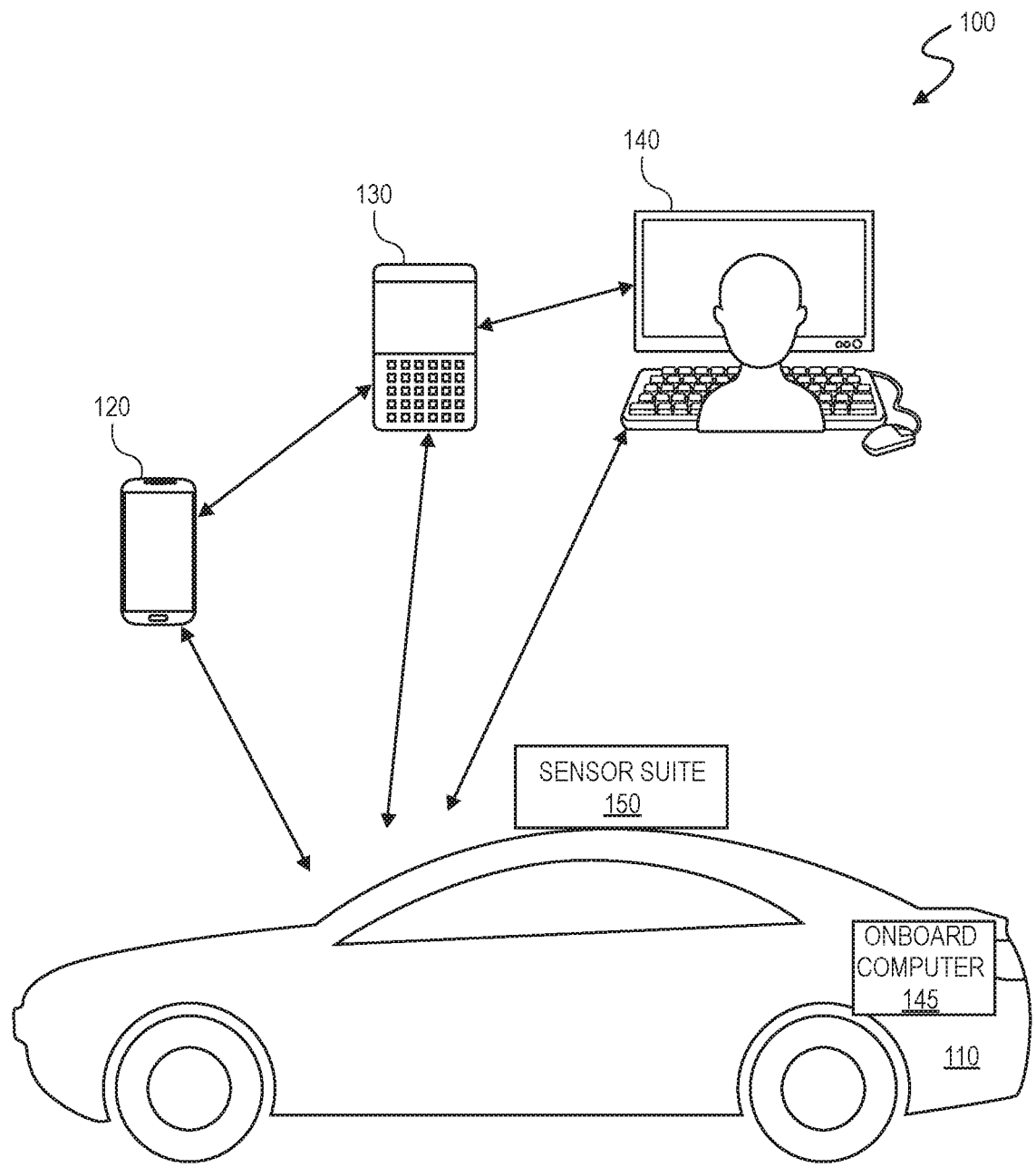
FIG. 1 illustrates an example autonomous vehicle according to some embodiments of the present disclosure may be implemented.

The systems, methods and devices of this disclosure each have several innovative aspects, no single one of which is solely responsible for the all the desirable attributes disclosed herein. Details of one or more implementations of the subject matter described in this specification are set forth in the description below and the accompanying drawings.

Embodiments of the present disclosure provide a system for controlling a temperature of a computer disposed in an enclosed compartment of a vehicle. The system includes at least one temperature sensor associated with the computer, the at least one temperature sensor for providing temperature data in connection with the computer to a control module; at least one air vent provided in a surface of the enclosed compartment, wherein the at least one air vent is positioned to direct air flow to a designated area of the computer; an air conditioning system for generating air at an air temperature specified by the control module based at least in part on the temperature data provided by the at least one temperature sensor; and at least one duct for conducting the air generated by the air conditioning system into the enclosed compartment via the at least one vent.

Embodiments of the present disclosure also provide an autonomous vehicle ("AV") comprising an enclosed compartment having an autonomous driving system computer ("ADSC") disposed therein; at least one temperature sensor associated with the ADSC, the at least one temperature sensor for providing temperature data in connection with the ADSC to a vehicle integration control module ("VICM"); at least one air vent provided in a surface of the enclosed compartment, wherein the at least one air vent is positioned to direct air flow to a designated area of the ADSC; an air conditioning system for generating air at an air temperature specified by the VICM based at least in part on the temperature data provided by the at least one temperature sensor; and at least one duct disposed beneath a floorboard of the vehicle for conducting the air generated by the air conditioning system into the enclosed compartment via the at least one vent.

Embodiments of the present disclosure still further provide a method comprising providing a computer in an enclosed compartment of a vehicle; using at least one temperature sensor associated with the computer to provide temperature data in connection with the computer to a control module; providing at least one air vent in a surface of the enclosed compartment proximate the computer to direct air flow toward the computer; generating air at an air temperature specified by the control module based at least in part on the temperature data provided by the at least one temperature sensor; and conducting the generated air at the specified air temperature into the enclosed compartment via a duct connected to the at least one vent, wherein the duct is provided beneath a floorboard of the vehicle.

Embodiments disclosed herein may be particularly advantageous for automatically triggering the cooling the ADSC of an autonomous vehicle using the vehicle's air conditioning system, thereby to maintain the ADSC at an optimal operational temperature or range of temperatures.

As will be appreciated by one skilled in the art, aspects of the present disclosure, in particular aspects of an ADSC temperature regulation system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

One embodiment is a system for temperature regulation of a vehicle's ADSC using the vehicles air conditioning (AC) system. In accordance with certain embodiments, one or more temperature sensors associated with the ADSC triggers the vehicle's AC system to direct cool air to vents provided an area of the vehicle where the ADSC is located (e.g., the trunk of the vehicle). Duct work may be provided underneath the floorboard of the vehicle to convey cool air from the AC system to the vents trained on the ADSC, thereby to prevent the ADSC from overheating and causing it to run even more efficiently than previously possible, resulting in faster computing by the ADSC in some instances.

As shown in FIG. 1, a system 100 according to embodiments described herein includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

The system 100 functions to enable an autonomous vehicle 110 to modify and/or set a driving behavior in response to parameters set by vehicle passengers (e.g., via the passenger interface 120) and/or other interested parties (e.g., via the vehicle coordinator 130 or remote expert interface 140). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles no may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer 145 and a sensor suite 150 (e.g., computer vision ("CV") system, LIDAR, RADAR, wheel speed sensors, GPS, cameras, etc.). The onboard computer 145 may be implemented as an ADSC and functions to control the autonomous vehicle 110 and processes sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles no. Based upon the vehicle state and programmed instructions, the onboard computer 145 preferably modifies or controls behavior of autonomous vehicles 110. The onboard computer 145 is preferably a general-purpose computer adapted for I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, SONAR, LIDAR, GPS, inertial measurement units (IMUS), accelerometers, microphones, strain gauges, pressure monitors, barometers, thermometers, altimeters, etc.

Figure 2:
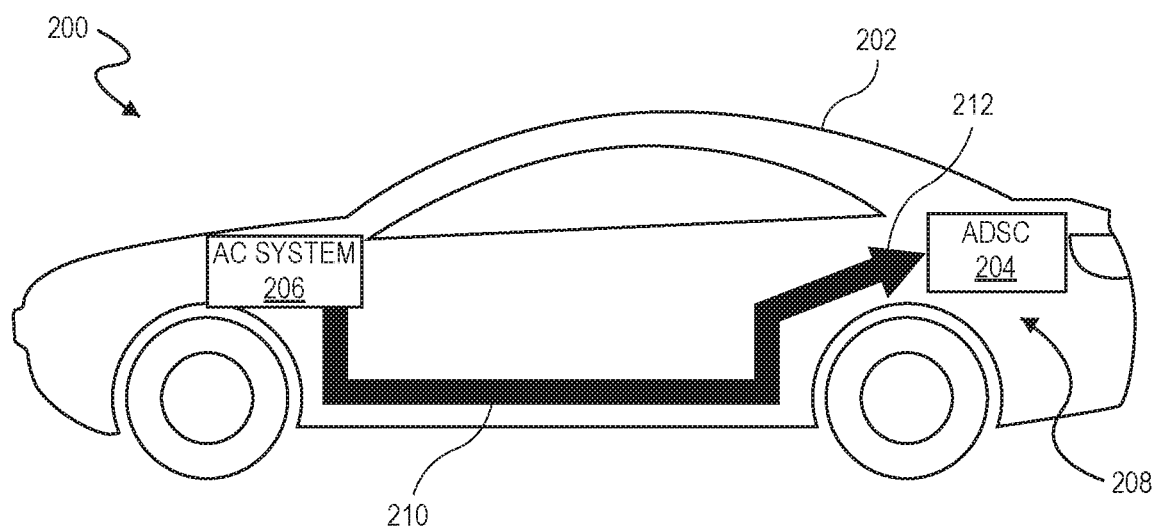
FIG. 2 illustrates an example autonomous vehicle in which an ADSC temperature regulation system according to some embodiments of the present disclosure may be implemented.

Referring now to FIG. 2, illustrated therein is a system 200 implemented in a vehicle, such as an autonomous vehicle 202, for temperature regulation of the autonomous vehicle's onboard computer, represented in FIG. 2 by an ADSC 204, using an AC system 206 of the autonomous vehicle. In the embodiment illustrated in FIG. 2, the ADSC 204 is disposed in, or integrated into, an enclosed compartment, such as a trunk area 208, of the autonomous vehicle 202, although it will be recognized that the features of embodiments described herein may be advantageously deployed in systems in which a vehicle's ADSC is enclosed in another area thereof. In accordance with features of embodiments described herein, one or more ducts, represented in FIG. 2 by a duct 210, convey cool air from the AC system 206 underneath a floor board of the vehicle 202 to the trunk area 208, where the air is directed toward the ADSC 204 via one or more vents, represented in FIG. 2 by a vent 212. In accordance with features of embodiments described herein, the vents are disposed on one or more walls of the of the trunk area and arranged to direct air toward the ADSC so as to provide maximum cooling of the ADSC.

As will be illustrated and described in greater detail with reference to FIG. 3, temperature sensors are associated with, integrated into, and/or disposed within the ADSC 204 and/or the trunk area 218 for triggering activation of the system 200 for automatically maintaining the ADSC 204 at a selected temperature or within a selected temperature range for optimizing operation and performance of the ADSC within the autonomous vehicle 202.

Figure 3:
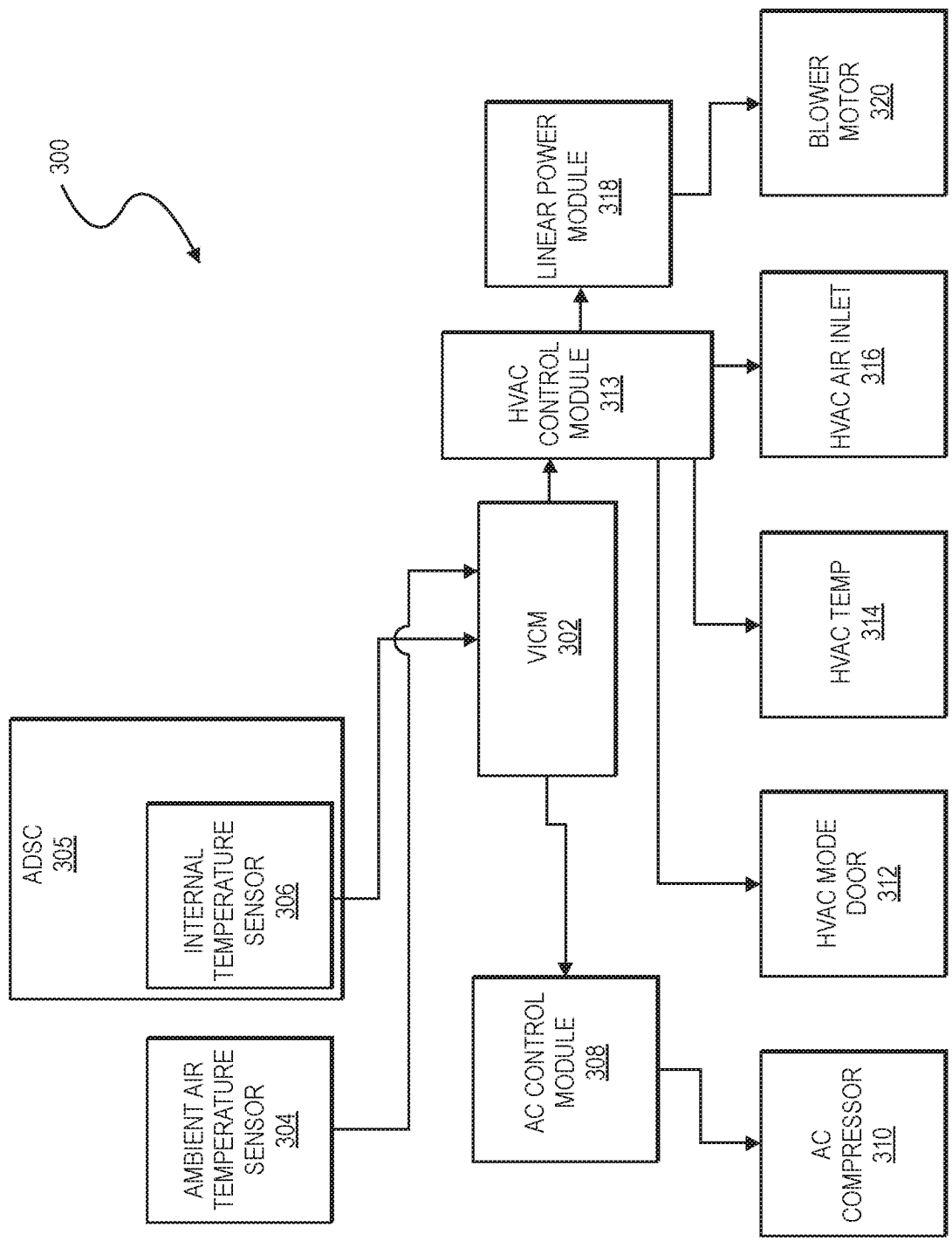
FIG. 3 illustrates a block diagram of an example ADSC temperature regulation system for an autonomous vehicle according to some embodiments of the present disclosure.

Referring now to FIG. 3, illustrated therein is a system block diagram of a system 300 for temperature regulation of a vehicle's ADSC using the AC system of the vehicle. As shown in FIG. 3, the system 300 includes a vehicle integration control module (VICM) 302 for receiving temperature data from temperature sensors, which may include an ambient air temperature sensor 304 disposed in an area of the vehicle in which an ADSC being monitored, such as an ADSC 305, is deployed (including, e.g., on an outside surface of a housing of the ADSC), and an internal temperature sensor 306, which is disposed inside the housing of the ADSC being monitored. As will be described in greater detail with reference to FIG. 4, VICM 302 includes hardware and software for processing the received temperature data to determine whether the internal/operational and/or ambient/environmental temperature of the ADSC exceeds an optimum temperature and/or temperature range (taking into account the number and relative location(s) of the temperature sensors) and, based on results of the processing, controls operation of an AC control module 308, which in turn controls operation of an AC compressor 310, an HVAC blend door actuator 312, and an HVAC control module 313. The HVAC control module 313 controls operation of an HVAC temperature module 314, an HVAC air inlet 316, and a linear power motor 318, which in turn controls operation of a blower motor 320, to maintain an operational and/or ambient temperature of the ADSC at an optimal level or within an optimal range based on a number and configuration of vents installed in the compartment relative to the ADSC.

It will be noted that, while it would be ideal to keep maintain the ambient and operational temperatures of the ADSC extremely low, the interest in doing so must be weighed against the expense of constantly providing cool or cold air to the compartment, whether or not actually needed, as well as the comfort of the AV's passengers in not being overly air conditioned, especially in cold weather. Therefore, it is a goal of embodiments herein to cool the ADSC and/or the compartment in which it may be maintained, only as needed and at temperatures necessary to maintain full operation of the ADSC.

Figure 4:
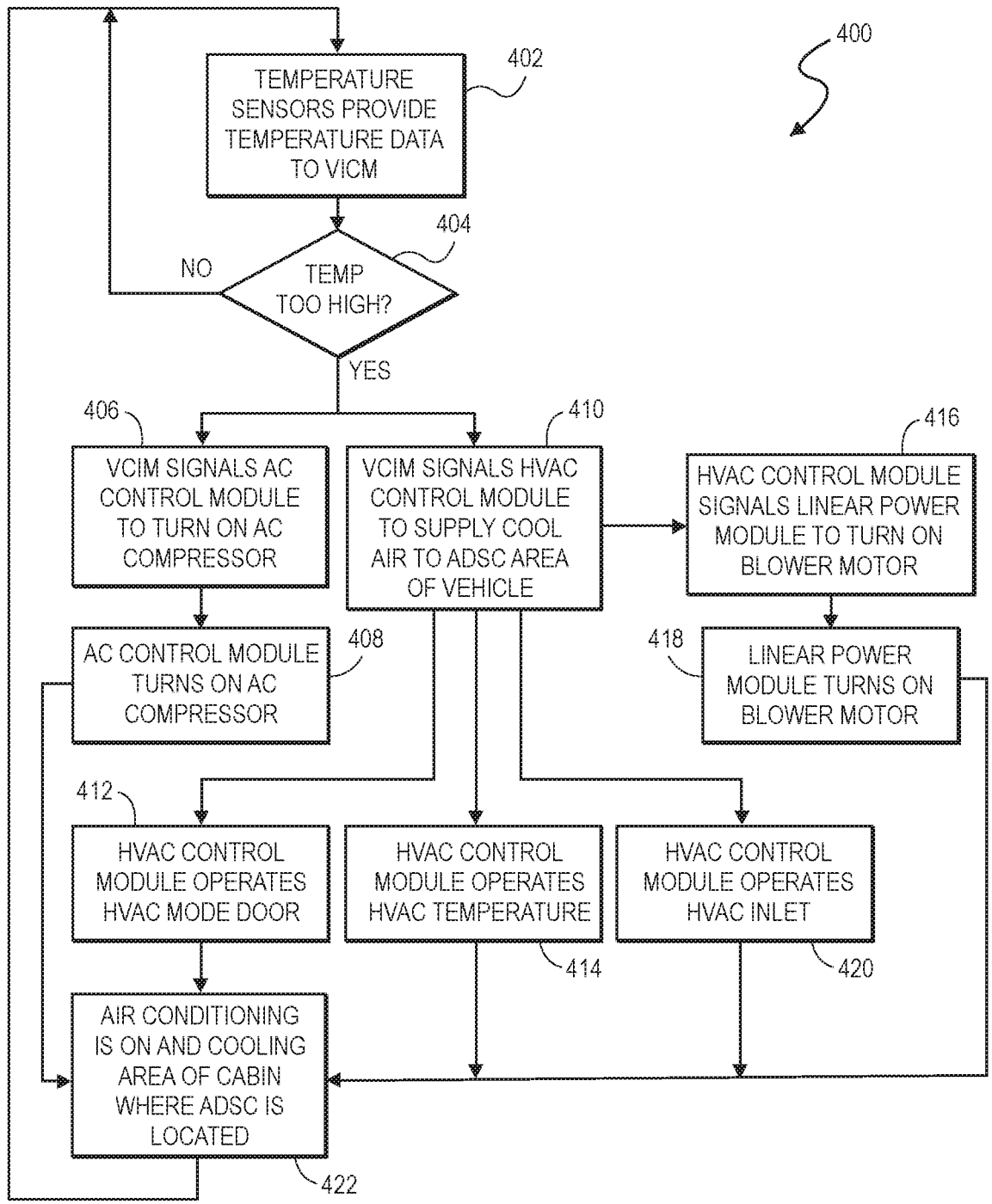
FIG. 4 illustrates a flow chart of example operations that may be implemented by an example ADSC temperature regulation system for an autonomous vehicle according to some embodiments of the present disclosure.

Referring now to FIG. 4, illustrated therein is a flowchart 400 illustrating an example operation of the system 300 (FIG. 3) for regulating the temperature of a vehicle's ADSC using the AC system of the vehicle to maintain the operational and/or ambient temperature of the ADSC within an temperature range to achieve optimal operation of the ADSC. In step 402, one or more temperature sensors, such as temperature sensors 304, 306, respectively provide ambient and internal temperature data to the VICM, such as VICM 302. In step 404, the VICM processes the received temperature data and determines whether the temperature exceeds an acceptable temperature or range of temperatures to ensure optimum operation of the ADSC. This step may be performed by comparing the ambient temperature to an ambient temperature threshold and, if the ambient temperature exceeds the ambient temperature threshold, indicating that the ambient temperature is too high. Similarly, this step may be performed by comparing the operational temperature to an operational temperature threshold and, if the operational temperature exceeds the operational temperature threshold, indicating that the operational temperature is too high. Alternatively, both ambient temperature and operational temperature may be combined according to some ratio and the result compared to a combined temperature threshold which if exceeded indicates that the temperature is too high.

If it is determined in step 404 that the temperature is not (and/or temperatures are not) too high, execution returns to step 402; otherwise, execution proceeds to step 406. In step 406, the VICM signals the AC control motor (e.g., AC control module 308) to turn on the AC compressor (e.g., AC compressor 310). In step 408, the AC control module turns on the AC compressor. In this manner, the VICM controls both the temperature and the velocity/pressure of the air provided to the compartment in which the ADSC is enclosed via the duct(s) and vent(s) thereby to maintain the temperature of the ADSC at a level that ensures optimal operation thereof.

Contemporaneously with signaling the AC control module (step 406), in step 410, the VICM signals the HVAC control module (e.g., HVAC control module 313) to supply cool air to the area of the vehicle in which the ADSC is contained. In step 412, the HVAC control module operates the HVAC mode door. Substantially contemporaneously with step 412, in step 414, the HVAC control module operates the HVAC temperature to set the temperature of the air to be provided to the area of the vehicle in which the ADSC is contained. Substantially contemporaneously with steps 412 and 414, in step 416, the HVAC control module signals the linear power module (e.g., linear power module 318) to turn on the blower motor (e.g., blower motor 320) and in step 418, the linear power module turns on the blower motor at a speed and/or volume to provide sufficient cooling under the circumstances indicated by the temperature data and as selected by the AC control module. Substantially contemporaneously with steps 412, 414, and 416, in step 420, the HVAC control module operates the HVAC inlet 420. Upon completion of steps 408, 412, 414, 416, and 420, in step 422, air conditioning is on and set at a temperature and volume necessary for cooling the area of the vehicle in which the ADSC is contained. Execution then returns to step 402 such that continuous monitoring, cooling, and AC adjustment may be provided to ensure that the ADSC is continuously provided with an environment that ensures optimal operational temperature under the existing environmental conditions.

It will also be noted that, given the concerns noted above about over-cooling the area in which the ADSC is located (e.g., associated cost and/or comfort/discomfort of a passenger), in step 402, the ambient and/or operational temperatures may be compared with respective and/or combined temperature ranges and appropriate steps taken to raise the temperature of the air provided through the vents if the operational temperature of the ADSC is sufficiently cool. This comparison/determination may be performed using a lookup table, an algorithm, and/or machine learning.

Figure 5:
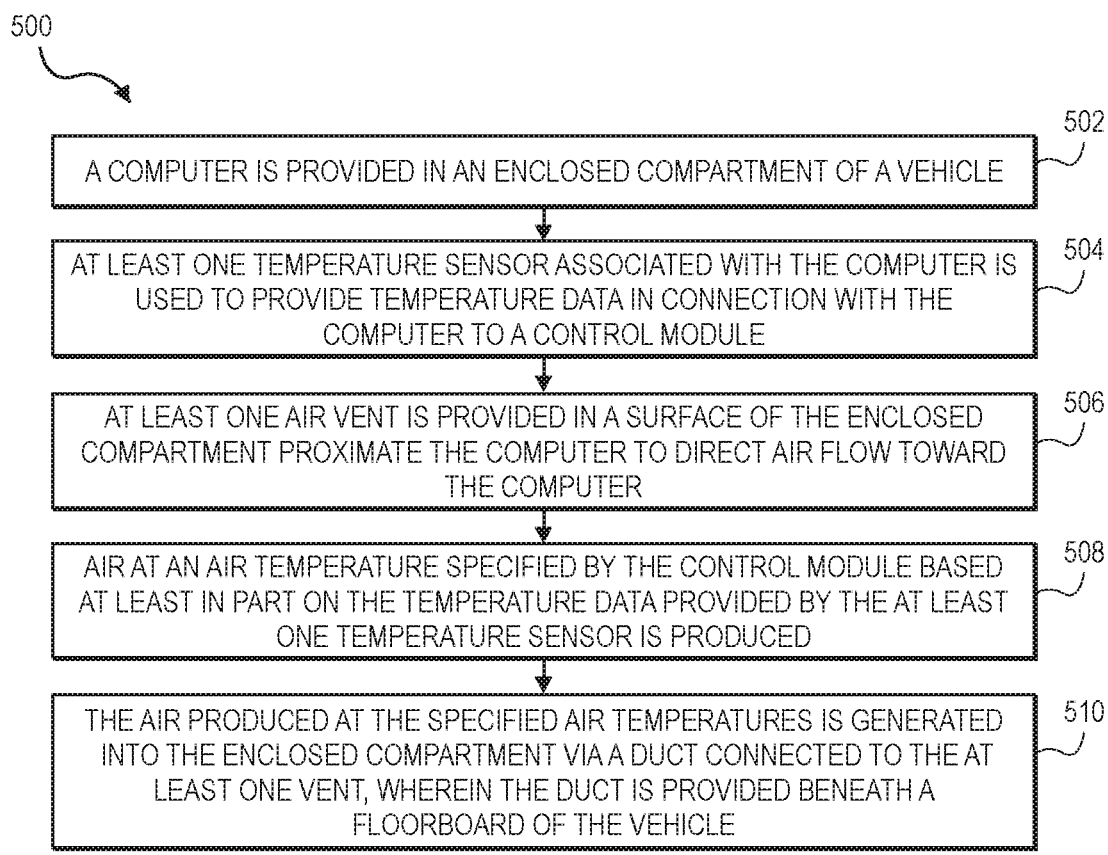
FIG. 5 illustrates another flow chart of example operations that may be implemented by an example ADSC temperature regulation system for an autonomous vehicle according to some embodiments of the present disclosure.

FIG. 5 is a simplified flowchart 500 illustrating an example manner of implementing of the system 300 (FIG. 3) for regulating the temperature of a vehicle's ADSC using the AC system of the vehicle to maintain the operational and/or ambient temperature of the ADSC within an temperature range to achieve optimal operation of the ADSC. In step 502, a computer is provided in an enclosed compartment of a vehicle. In step 504, at least one temperature sensor associated with the computer is used to provide temperature data in connection with the computer to a control module. In step 506, at least one air vent is provided in a surface of the enclosed compartment proximate the computer to direct air flow toward the computer. In step 508, air at an air temperature specified by the control module based at least in part on the temperature data provided by the at least one temperature sensor is produced. In step 510, the air generated at the specified air temperature is generated into the enclosed compartment via a duct connected to the at least one vent, wherein the duct is provided beneath a floorboard of the vehicle.

Example 1 is a system for controlling a temperature of a computer disposed in an enclosed compartment of a vehicle, the system comprising: at least one temperature sensor associated with the computer, the at least one temperature sensor for providing temperature data in connection with the computer to a control module; at least one air vent provided in a surface of the enclosed compartment, wherein the at least one air vent is positioned to direct air flow to a designated area of the computer; an air conditioning system for generating air at an air temperature specified by the control module based at least in part on the temperature data provided by the at least one temperature sensor; and at least one duct for conducting the air generated by the air conditioning system into the enclosed compartment via the at least one vent.

In Example 2, the system of Example 1 can optionally include the at least one temperature sensor comprising a sensor disposed inside a housing of the computer to sense an operational temperature of the computer.

In Example 3, the system of any of Examples 1-2 can optionally include the at least one temperature sensor comprising a sensor disposed on a surface external to the computer to sense an ambient temperature of the computer.

In Example 4, the system of any of Examples 1-3 can optionally include the at least one temperature sensor comprising a first sensor disposed inside a housing of the computer and a second sensor disposed on a surface external to the computer.

In Example 5, the system of any of Examples 1-4 can optionally include the air generated by the air conditioning system being conducted through the at least one air vent at a pressure and velocity determined by the control module based at least in part on the temperature data.

In Example 6, the system of any of Examples 1-5 can optionally include the vehicle comprising an autonomous vehicle ("AV").

In Example 7, the system of Example 6 can optionally include the computer comprising an automated driving system computer ("ADSC").

In Example 8, the system of Example 6 can optionally include the control module comprising a vehicle integration control module ("VICM").

In Example 9, the system of any of Examples 1-8 can optionally include the at least one air duct extending beneath a floorboard of the vehicle.

Example 10 is an autonomous vehicle ("AV") comprising: an enclosed compartment having an autonomous driving system computer ("ADSC") disposed therein; at least one temperature sensor associated with the ADSC, the at least one temperature sensor for providing temperature data in connection with the ADSC to a vehicle integration control module ("VICM"); at least one air vent provided in a surface of the enclosed compartment, wherein the at least one air vent is positioned to direct air flow to a designated area of the ADSC; an air conditioning system for generating air at an air temperature specified by the VICM based at least in part on the temperature data provided by the at least one temperature sensor; and at least one duct disposed beneath a floorboard of the vehicle for conducting the air generated by the air conditioning system into the enclosed compartment via the at least one vent.

In Example 11, the AV of Example 10 can optionally include the at least one temperature sensor comprising a sensor disposed inside a housing of the ADSC.

In Example 12, the AV of any of Examples 10-11 can optionally include the at least one temperature sensor comprising a sensor disposed on a surface external to external a housing of the ADSC.

In Example 13, the AV of any of Examples 10-12 can optionally include the at least one temperature sensor comprising a first sensor disposed inside a housing of the ADSC and a second sensor disposed on a surface external to the housing of the ADSC.

In Example 14, the AV of any of Examples 10-13 can optionally include the air generated by the air conditioning system being conducted through the at least one air vent at a pressure and velocity determined by the VICM based at least in part on the temperature data.

Example 15 is a method comprising: providing a computer in an enclosed compartment of a vehicle; using at least one temperature sensor associated with the computer to provide temperature data in connection with the computer to a control module; providing at least one air vent in a surface of the enclosed compartment proximate the computer to direct air flow toward the computer; generating air at an air temperature specified by the control module based at least in part on the temperature data provided by the at least one temperature sensor; and conducting the air generated at the specified air temperature into the enclosed compartment via a duct connected to the at least one vent, wherein the duct is provided beneath a floorboard of the vehicle.

In Example 16, the method of Example 15 can further include the at least one temperature sensor comprising a sensor disposed inside a housing of the computer.

In Example 17, the method of any of Examples 15-16 can further include the at least one temperature sensor comprising a sensor disposed on an external surface of a housing of the computer.

In Example 18, the method of any of Examples 15-17 can further include the at least one temperature sensor comprising a first sensor disposed inside a housing of the computer and a second sensor disposed on an external surface of the housing of the computer.

In Example 19, the method of any of Examples 15-18 can further include the air generated by the air conditioning system being conducted through the at least one air vent at a pressure and velocity determined by the control module based at least in part on the temperature data.

In Example 20, the method of any of Examples 15-19 can further include the vehicle comprising an autonomous vehicle ("AV") and the computer comprises an automated driving system computer ("ADSC").

Example 21 is an apparatus comprising: means for providing a computer in an enclosed compartment of a vehicle; using at least one temperature sensor associated with the computer to provide temperature data in connection with the computer to a control module; means for providing at least one air vent in a surface of the enclosed compartment proximate the computer to direct air flow toward the computer; means for generating air at an air temperature specified by the control module based at least in part on the temperature data provided by the at least one temperature sensor; and means for conducting the air generated at the specified air temperature into the enclosed compartment via a duct connected to the at least one vent, wherein the duct is provided beneath a floorboard of the vehicle.

In Example 22, the apparatus of Example 21 can further include the at least one temperature sensor comprising a sensor disposed inside a housing of the computer.

In Example 23, the apparatus of any of Examples 21-22 can further include the at least one temperature sensor comprising a sensor disposed on an external surface of a housing of the computer.

In Example 24, the apparatus of any of Examples 21-23 can further include the at least one temperature sensor comprising a first sensor disposed inside a housing of the computer and a second sensor disposed on an external surface of the housing of the computer.

In Example 25, the apparatus of any of Examples 21-24 can further include the air generated by the air conditioning system being conducted through the at least one air vent at a pressure and velocity determined by the control module based at least in part on the temperature data.

In Example 26, the apparatus of any of Examples 21-25 can further include the vehicle comprising an autonomous vehicle ("AV") and the computer comprises an automated driving system computer ("ADSC").

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

As described herein, one aspect of the present technology may include the gathering and use of data available from various sources to improve quality and experience. The present disclosure contemplates that in some instances, this gathered data may include personal information. The present disclosure contemplates that the entities involved with such personal information respect and value privacy policies and practices.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A system for controlling a temperature of a computer disposed in an enclosed compartment of a vehicle, the system comprising: at least one temperature sensor located in the enclosed compartment, the at least one temperature sensor for outputting temperature data in connection with the computer; a vehicle integration control module (VICM) configured to compare the temperature data with a threshold temperature and to determine an air temperature, a pressure, and a velocity based on results of the comparing when the temperature data is above the threshold temperature; at least one air vent provided in a surface of the enclosed compartment, wherein the at least one air ent is positioned to direct air flow to a designated area of the computer; an air conditioning system for generating air at the air temperature, the pressure, and the velocity determined by the VICM, the air conditioning system comprising: an air conditioning compressor for generating the air at the determined air temperature; a blower motor comprising a linear power module, the blower motor for generating the air at the determined pressure and velocity; and an air conditioning control module for controlling operation of the air conditioning compressor and the blower motor; and at least one duct for conducting the air generated by the air conditioning system into the enclosed compartment via the at least one vent when a door associated with the duct is open and for preventing the air generated by the air conditioning system from flowing into the enclosed compartment via the at least one vent when the door associated with the duct is closed; wherein the air conditioning control module is configured to automatically and selectively control a position of the door based on the comparing, and wherein the at least one temperature sensor comprises a first sensor disposed inside a housing of the computer and a second sensor disposed on a surface external to the computer.

2. The system of claim 1, wherein the at least one temperature sensor comprises a sensor disposed inside a housing of the computer to sense an operational temperature of the computer.

3. The system of claim 1, wherein the at least one temperature sensor comprises a sensor disposed on a surface external to the computer to sense an ambient temperature of the computer.

4. The system of claim 1, wherein the vehicle comprises an autonomous vehicle ("AV").

5. The system of claim 4, wherein the computer comprises an automated driving system computer ("ADSC").

6. The system of claim 1, wherein the at least one air duct extends beneath a floorboard of the vehicle.

7. An autonomous vehicle ("AV") comprising: an enclosed compartment having an autonomous driving system computer ("ADSC") disposed therein; at least one temperature sensor located in the enclosed compartment and associated with the ADSC, the at least one temperature sensor for providing temperature data in connection with the ADSC; a vehicle integration control module ("VICM"), wherein the VCIM is configured to compare the temperature data with a threshold temperature and to determine an air temperature, a pressure, and a velocity based on results of the comparing when the temperature data is above the threshold temperature; at least one air ent provided in a surface of the enclosed compartment, wherein the at least one air ent is positioned to direct air flow to a designated area of the ADSC; an air conditioning system for generating air at the air temperature, the pressure, and the velocity determined by the VCIM, the air conditioning system comprising: an air conditioning compressor for generating the air at the determined air temperature; a blower motor for generating the air at the determined pressure and velocity; and an air conditioning control module for controlling operation of the air conditioning compressor and the blower motor; and at least one duct disposed beneath a floorboard of the vehicle for conducting the air generated by the air conditioning system into the enclosed compartment via the at least one vent, and wherein the at least one temperature sensor comprises a first sensor disposed inside a housing of the ADSC and a second sensor disposed on a surface external to the housing of the ADSC.

8. The AV of claim 7, wherein the at least one temperature sensor comprises a sensor disposed inside a housing of the ADSC.

9. The AV of claim 7, wherein the at least one temperature sensor comprises a sensor disposed on a surface external to a housing of the ADSC.

10. The AV of claim 7, wherein the air generated by the air conditioning system is conducted through the at least one air vent at a pressure and velocity determined by the VICM based at least in part on the temperature data.

11. A method comprising: providing a computer in an enclosed compartment of a vehicle; using at least one temperature sensor associated with the computer to provide temperature data in connection with the computer to a vehicle integration control module (VICM); using the VICM to compare the temperature data with a threshold temperature and to determine an air temperature, a pressure, and a velocity based on results of the comparing when the temperature data is above the threshold temperature; providing at least one air ent in a surface of the enclosed compartment proximate the computer to direct air flow toward the computer; generating by an air conditioning system air at the air temperature, the pressure, and the velocity determined by the VICM, the air conditioning system comprising: an air conditioning compressor for generating the air at the determined air temperature; a blower motor for generating the air at the determined pressure and velocity; and an air conditioning control module for controlling operation of the air conditioning compressor and the blower motor; and conducting the air generated by the air conditioning system at the specified air temperature into the enclosed compartment via a duct connected to the at least one vent when a door associated with the duct is open and preventing the air generated by the air conditioning system from flowing into the enclosed compartment via the at least one vent when the door associated with the duct is closed, wherein the duct is provided beneath a floorboard of the vehicle; and wherein the air conditioning control module is configured to automatically and selectively control a position of the door based on the comparing, and wherein the at least one temperature sensor comprises a first sensor disposed inside a housing of the computer and a second sensor disposed on an external surface of the housing of the computer.

12. The method of claim 11, wherein the at least one temperature sensor comprises a sensor disposed inside a housing of the computer.

13. The method of claim 11, wherein the at least one temperature sensor comprises a sensor disposed on an external surface of a housing of the computer.

14. The method of claim 11, wherein the air generated by the air conditioning system is conducted through the at least one air vent at a pressure and velocity determined by the VICM based at least in part on the temperature data.

15. The method of claim 11, wherein the vehicle comprises an autonomous vehicle ("AV") and the computer comprises an automated driving system computer ("ADSC").

* * * * *